United States Patent [19]

Braden

[11] Patent Number: 5,226,382
[45] Date of Patent: Jul. 13, 1993

[54] APPARATUS FOR AUTOMATICALLY METALIZING THE TERMINAL ENDS OF MONOLITHIC CAPACITOR CHIPS

[76] Inventor: Denver Braden, 440 Jason La., San Marcos, Calif. 92069

[21] Appl. No.: 702,309

[22] Filed: May 20, 1991

[51] Int. Cl.$^5$ .......................... B05C 3/10; B05C 3/18; B05C 3/20; B05C 13/00
[52] U.S. Cl. .................... 118/406; 118/419; 118/421; 118/423; 118/213; 118/500; 118/504
[58] Field of Search ............... 118/213, 406, 400, 419, 118/421, 500, 503, 504, 423

[56] References Cited

U.S. PATENT DOCUMENTS

| | | | |
|---|---|---|---|
| 3,453,989 | 7/1969 | Bippus | 118/503 |
| 3,721,379 | 3/1973 | Corsaro | 118/400 |
| 3,809,011 | 5/1974 | Fabre et al. | 118/504 |
| 4,381,321 | 4/1983 | Braden | 427/79 |
| 4,393,808 | 7/1983 | Braden | 118/503 |
| 4,526,129 | 7/1985 | Braden | 118/503 |
| 4,664,943 | 5/1987 | Nitta et al. | 118/503 |
| 4,669,416 | 6/1987 | Delgado et al. | 118/504 |
| 4,865,455 | 8/1989 | Tee | 118/503 |
| 4,965,089 | 10/1990 | Sauter et al. | 118/503 |
| 4,981,248 | 1/1991 | Hall | 118/504 |

FOREIGN PATENT DOCUMENTS

| | | | |
|---|---|---|---|
| 334022 | 9/1989 | European Pat. Off. | 118/400 |
| 1128793 | 4/1962 | Fed. Rep. of Germany | 118/503 |

Primary Examiner—W. Gary Jones
Assistant Examiner—Todd J. Burns
Attorney, Agent, or Firm—John J. Murphey

[57] ABSTRACT

Apparatus for automatically metalizing the terminal ends of monolithic capacitor chips, which includes an endless conveying tape having formed therein a plurality of first apertures, a plurality of thin, resilient masks, each adapted for receipt in one of the apertures, in co-planar, fixed registration therewith, each mask having at least one second aperture formed therethrough of a size and shape to compliantly receive a chip therein, in an orientation whereby the contact surfaces extend outward from both sides of the tape, a way to for load the masks with a plurality of chips including a cylindrical wall having formed therethrough at least one orifice for registration with the second aperture in the mask, the cylindrical wall adapted for rotation through an inventory of the chips for introduction of the chips into the orifice in transverse specific alignment with their contact surfaces extending outward from the cylindrical wall orifices, a way to accurately move the chip-loaded orifices into registration with the second apertures in the masks, a way to transfer the chips from the orifices into the second apertures along a rectilinear path therebetween, a way to pass the contact surfaces of the chips through an inventory of end-termination paste, and, a way to dry the paste and expel the chips from the mask to prepare the masks to receive a new inventory of chips as the endless conveying tape proceeds to repeat its circuit.

26 Claims, 6 Drawing Sheets

APPARATUS FOR AUTOMATICALLY METALIZING THE TERMINAL ENDS OF MONOLITHIC CAPACITOR CHIPS

BACKGROUND OF THE INVENTION

1. Field of the Invention

This invention pertains to the field of electronic circuitry generally associated with computers and computer-based hardware. More particularly, this invention pertains to the field of handling and metalizing the terminal ends of integrated circuit components known as "monolithic capacitor chips" and to an apparatus for automatically processing large quantities thereof.

2. Description of the Prior Art

Developments in the field of computers and computer-based hardware has led to a reduction in the overall size of all components thereof and such shrinking appears to be continuing unabated. Especially in the field of electronic components, what Michael Faraday discovered as a large capacitor (the Lyden jar) has transitioned through cylindrical devices of various sizes down to tiny computer capacitors such as those described in U.S. Pat. Nos. 3,231,082 and 3,587,524 through even further shrinkage to those described in U.S. Pat. Nos. 4,664,943 and 4,489,923. These latter devices are now made smaller than grains of rice. They are known as "chips".

These capacitors are known as electrical energy storage devices which are used in the electronics industry for many useful applications. For instance, they are widely used as elements of resonant circuits, in coupling and by-pass applications, for blocking direct current, as filters and as delay-line components in voltage suppression. These capacitors are used extensively in millions of electronic assemblies and their use is increasing many fold every year. As the need for greater quantity increases, price erosion also increases, and it is imperative that the chip manufacturer find ways to improve quality and to cut operating costs in order to stay competitive.

In line with shrinkage of the body and overall size of capacitor chip, the appendages have also shrunk to the point where, in many cases, they no longer extend outward as electrical leads. Chips are now so small, i.e., on the order of 0.010–0.020 inches along an edge, and that in lieu of electronic lead wires extending therefrom, the opposed ends of the body of the component may now act as the electrical contacts.

This invention is related to the handling and processing of these small capacitor chips. It will automatically feed and accurately apply a termination paste to the ends of the capacitor chips and then dry the paste at a high thru-put. There are systems commercially available today that will process this high quantity of chips, but they are labor-intensive and require at least one operator per machine to load and unload the chips. This prior art can be seen in my prior art patent, U.S. Pat. No. 4,381,321 titled, "METHOD OF PROCESSING MINIATURE ELECTRONIC COMPONENTS SUCH AS CAPACITORS OR RESISTORS," and my other U.S. Pat. No. 4,526,129 titled, "MEANS FOR PROCESSING MINIATURE ELECTRONIC COMPONENTS SUCH AS CAPACITORS OR RESISTORS."

These ceramic capacitor chips are multi-layered ceramic and metal composites. The interlayered metal electrodes, or conductors, are insulated by thin, ceramic dielectric layers. The conductive layers are connected at each end by means of a metal termination which is applied to the ends of the chips as a liquid paste. After application, the paste is dried and then fired in a high-temperature oven at or near 1500° F. to become a semi-hard and solderable surface to which electronic lead wires may later be attached. The chips may also be directly attached without lead wires to a circuit board by applying solder paste to the circuit board pads, laying the chips on the solder paste-treated pads and reflowing the solder by means of direct controlled heat, or by gluing the chips to the pads and then running through a flow soldering machine.

SUMMARY OF THE INVENTION

The apparatus of this invention constitutes a significant improvement in the field of terminating the ends of chips to provide for high-speed operation, low unit-cost of processing, accuracy in obtaining the terminal coating and in the termination operation, itself, to provide for consistency in electrical properties between chips terminated by this process and reduce problems that have heretofore plagued this phase of the manufacture of electronic components.

This invention may briefly be described as an apparatus containing an endless tape that is driven through a variety of processing stages ending with the chips being fully and completely terminated at the respective ends thereof and accumulated for handling in the next phase of assembly. The endless tape of this invention is characterized by containing, in addition to a series of drive apertures for engagement with the drive sprockets, a plurality of transversely-oriented elongated apertures arranged centrally between the marginal edges of the tape and spaced uniformly therealong, each of which is adapted for receipt of a thin, resilient mask in co-planar fixed registration therewith, each mask having at least one orifice and preferably a series thereof formed therethrough of a size and shape to compliantly receive therein the chips in specific orientation whereby the ends to be terminated extend outward from the masks.

Means are provided for loading the masks with the chips that include a rotating loading bowel having a cylindrical wall that has formed therein at least one, but preferably a plurality of orifices of sizes and shapes that are compatible with the apertures formed in the masks carried in the endless tape, and adapted for rotation through an inventory of chips and other handling devices so that the chips are loaded in temporary receipt therein.

Other means are provided to integrate the movement of the tape with the rotation of the loading drum so that the chips in the cylindrical wall are brought into registration with the apertures formed in the masks and thereafter means are provided for transferring the chips from the orifices in the loading bowel to the apertures in the masks and adjusting them such that the ends thereof are all exposed and aligned on a common plane parallel with at least one side of the metal tape.

Thereafter, the tape is advanced by the drive sprockets and maneuvered by pulleys to pass through a termination paste applicator station so that the one set of ends of the chips are coated at a uniform depth with the paste. The tape with the masks and the chips contained therein is advanced to another station such as an oven wherein the terminated ends of the chips are dried. The chips are moved back into the masks to expose their opposite ends on the opposite sides of the tape and the tape is then advanced to the next terminating station whereby the exposed ends of the chips are subject to another operation such as the same-type terminating operation. The tape is then moved back through the drying oven and thereafter the double end-terminated chips are removed from the mask and tape so that they may be transferred to the next handling operation while the tape is advanced to the loading area so that the empty masks may be refilled with new, bare chips.

The transversely-oriented elongated apertures found in the tape are of such size and shape that the masks can be easily and swiftly removed therefrom and new masks inserted having different sizes, shapes and possibly numbers of apertures for receipt of a new batch of different sized and/or shaped chips. The cost of the masks is extremely low when compared to the cost to manufacture, drill and process a new handling plate such as described in the prior art patents. The inventory space generated by the accumulation of masks containing these different sized apertures is exceedingly small compared to the inventory as well as the cost of these other type prior art devices.

Accordingly, the main object of this invention is an apparatus for automatically terminating with metal paste the ends of monolithic capacitor chips that is amenable to handling a wide variety of sizes and shapes of chips without the attendant disadvantages heretofore found in the prior art.

Other objects of the invention include an apparatus for handling a wide variety of sizes and shapes of chips in a terminating process that does not require the manufacture of new handling plates for different sizes and shapes of chips; an apparatus having chip-retaining masks contained on an endless belt of such a nature that they are easily and readily interchangeable with new masks for receipt and handling of chips of different sizes and shapes; an apparatus utilizing an endless tape that is of relatively low cost to reduce replacement costs in the event of damage caused thereto; and, an apparatus that provides for the high-speed continuous end terminating of chips to lower overall unit operation and manufacturing costs, with the same or less labor content.

These and other objects of the invention will become more apparent when reading the following description of the preferred embodiment that is to be read along with the drawings appended hereto. The scope of proprietary protection this inventor seeks may be gleaned from a careful reading of the claims that conclude this specification.

DESCRIPTION OF THE DRAWINGS

FIG. 15 is an illustrative view of a portion of the loading wheel showing the manner in which the capacitor chips are introduced into the orifices for later transfer to the endless tape;

FIG. 17a is a side view of the transfer portion of the process where the capacitor chips are transferred from the loading wheel to the endless tape and FIG. 17b is a top, partially sectional view of FIG. 17a;

FIG. 18 is a top view of the paste application station over which the endless tape carrying the computer chips passes during the processing;

FIG. 19 is a side view of the embodiment shown in FIG. 18 with one side panel removed for clarity;

FIG. 20 is a front view of the chip alignment wheel in operation with the sprocket drive wheel taken along line 20 in FIG. 17; and, FIG. 21 is a close-up view of the operation of the alignment wheel shown in FIG. 20.

DESCRIPTION OF THE PREFERRED EMBODIMENT

Figure 1:
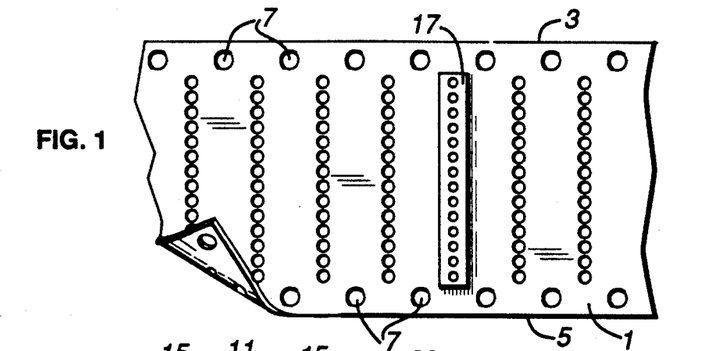
FIG. 1 is a top plan view of the endless tape utilized in this invention and showing a series of apertures formed therethrough for carrying the masks that carry the capacitor chips through the process of this invention.

Referring to FIG. 1, a significant portion of the apparatus of this invention comprises an endless conveying medium or tape 1 defined by spaced-apart mutually parallel marginal edges 3 and 5 and including a series of pilot or sprocket holes 7 that serve as drive perforations for receipt therein of the drive stubs of drive sprocket wheels 9 (see FIG. 16) that are disposed adjacent at least one marginal edge and preferably both marginal edges 3 and 5 and are uniformly spaced longitudinally along the tape. Preferably, conveying medium 1 is a flexible metal tape of stainless steel or other high strength metal, approximately 0.005" thick and about 2" wide. Tape 1 is of the "endless" variety meaning that it has no beginning or end but is maneuvered about a series of pulleys and sprocket wheels between various processing stations as will be hereinafter more fully set forth.

As shown in FIGS. 1, 4, 8, 10 and 11, a plurality of first apertures 11 formed in discreet patterns are spaced uniformly along tape 1, preferably intermediate marginal edges 3 and 5. Apertures 11 may be a series of closely-spaced round holes as shown in FIG. 1, a series of elongated rectangular openings as shown in the side portions of FIG. 2, or a series of elongated openings in repeated patterns in side-by-side arrangement as shown in the center portion of FIG. 2. Where first apertures 11 are in a configuration other than round holes, they are generally defined by a pair of spaced-apart elongated side edges 13 (see FIG. 2) terminated by a pair of short-end edges 15.

Figures 7, 13, 14:
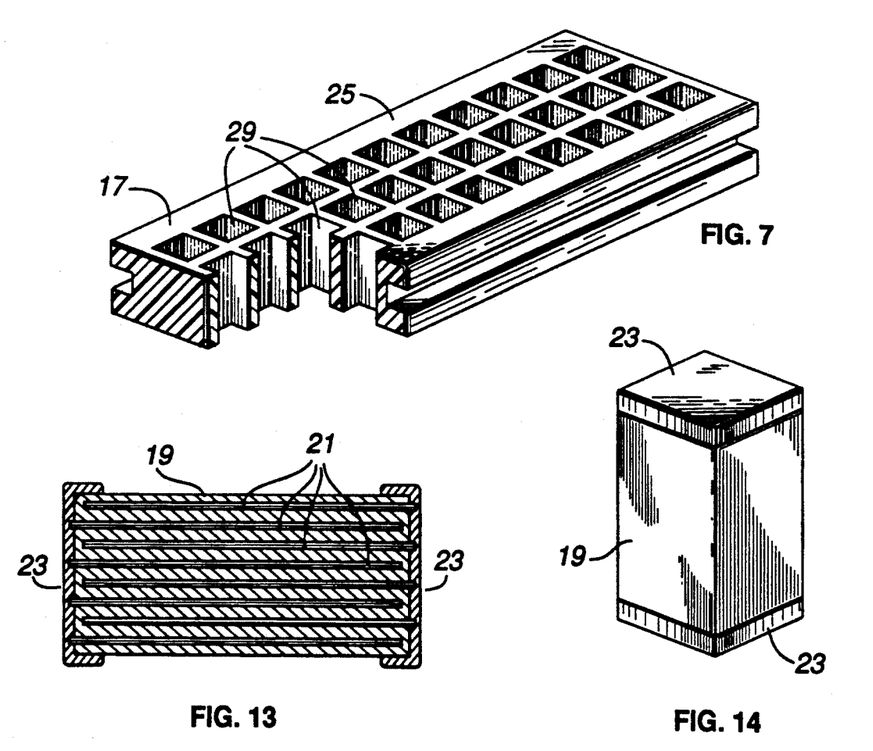
FIG. 13 is a sectional side view of a typical capacitor chip amenable for treatment in this invention.
FIG. 14 is an illustrative view of the capacitor chip shown in FIG. 13.
Figures 15, 18, 19, 20, 21:
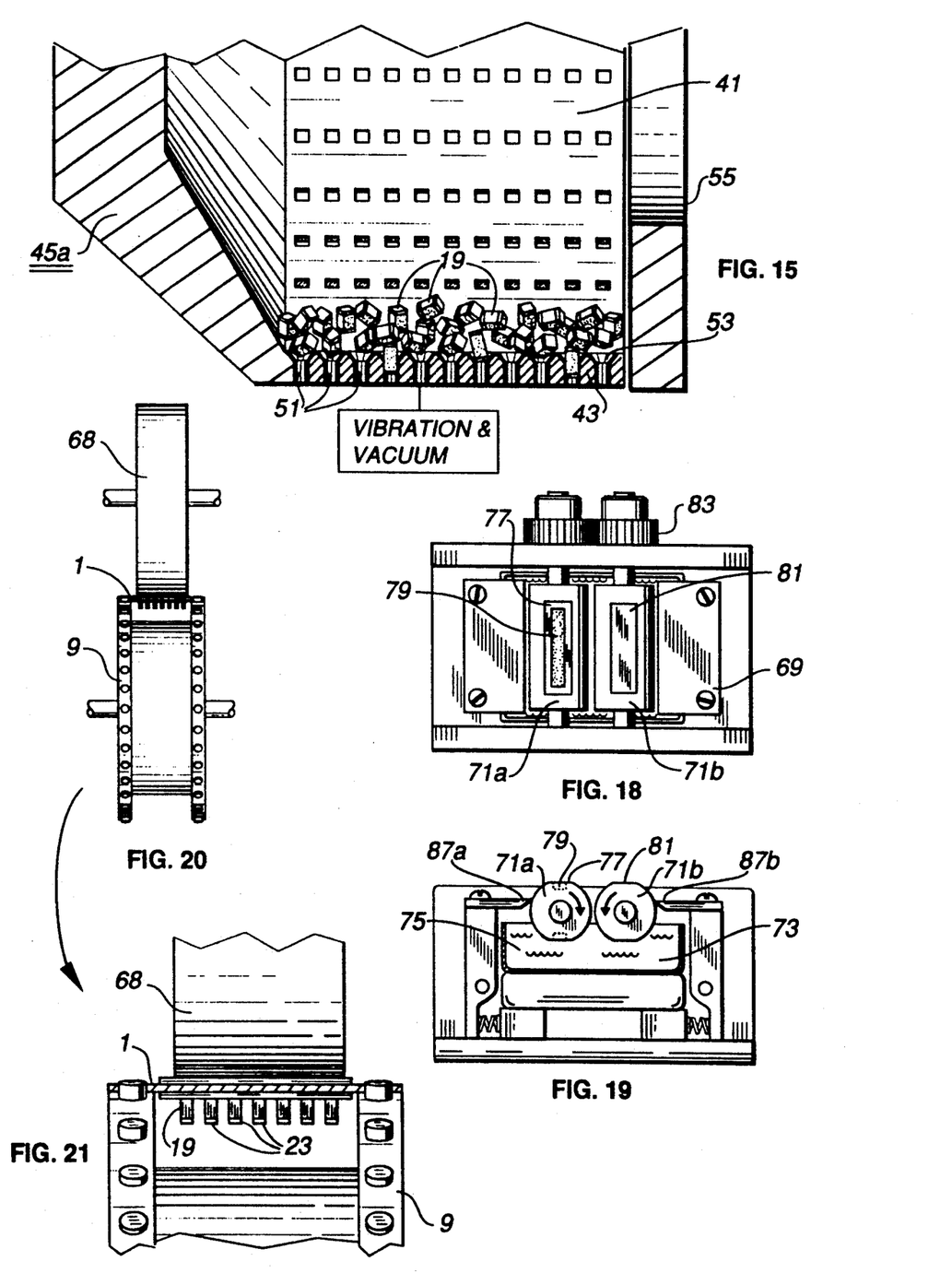

A mask 17 is provided for insertion or attachment in each of apertures 11. A "mask" is the term used in the art to define an element made of rubber or other resilient material that surrounds and partially encloses a chip during some stage in its process. The purpose of mask 17 is to provide a generally elongated resilient-walled holder wherein a chip may be temporarily housed during the process of metalizing the opposite ends thereof. Chips of the type amenable to processing by this inventive apparatus are shown in FIGS. 14 and 15 and generally have a solid enclosed body 19 of square or rectangular cross-section, made of ceramic or other dielectric material and containing a plurality of spaced-apart metal plates 21. One terminal end of each alternate plate 21 exits body 19 and is adapted for metalizing by this process that forms a pair of spaced-apart mutually opposed electronic contact surfaces or ends 23. In some cases, metal may be evaporated on ends 23.

Figures 5, 6:
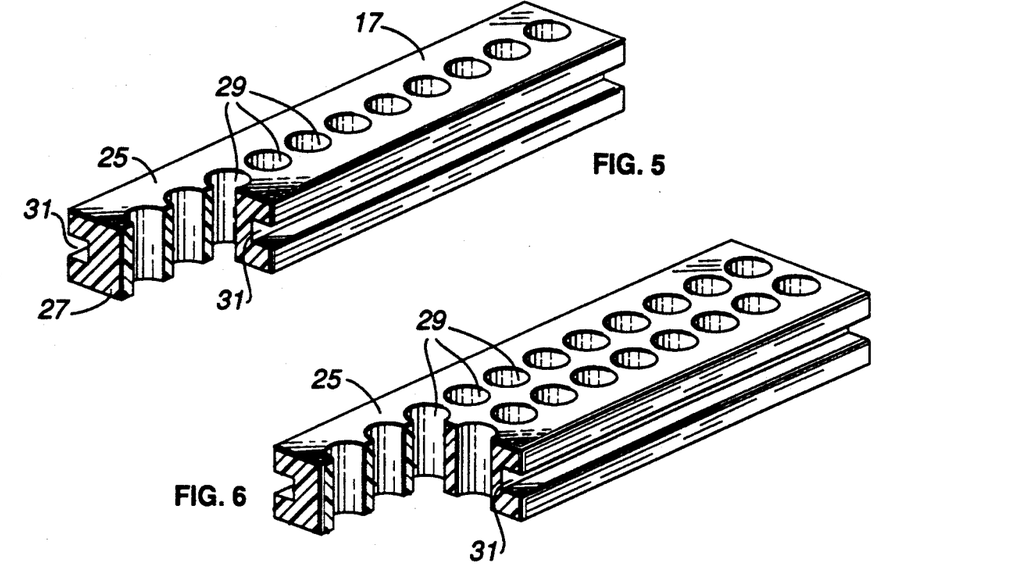
FIGS. 5, 6 and 7 are illustrative views of various patterns of apertures formed through said masks for carrying the capacitor chips to be processed in this invention.
Figure 9:
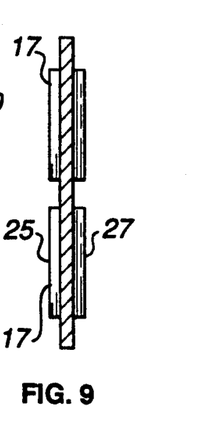

As shown in FIG. 5, mask 17 is defined by a pair of spaced-apart top and bottom exterior surfaces 25 and 27 respectively that, when mask 17 is in place on tape 1, lie respectively above and below the surfaces at tape 1 and co-planar therewith (see FIG. 9). In its simplest form, shown in FIG. 1, each mask 17 is cast in place about an aperture so that a plurality of them may be arranged in a pattern parallel to or transverse to the longitudinal axis of tape 1. Formed in each mask 17 is one or more second apertures 29 of a size smaller than first aperture 11, to maintain the metal of tape 1 out of contact with the chip, and, further, of a size slightly smaller than the chip in at least one direction so that the chip can be held therein positionally accepted, and resistively grasped during their advancement from one processing stage to another.

Also contemplated in this invention is a removable version of mask 17, as shown in FIGS. 4 through 12, that show a plurality of second apertures 29 cast in a discreet pattern, preferably uniform in character, for receipt therein of a plurality of chips in spaced-apart arrangement for processing in this apparatus. Removable masks 17 are defined, in addition to top and bottom surfaces 25 and 27, by a pair of opposed elongated slots 31 intermediate said top and bottom surfaces 25 and 27, for receipt therein of first aperture elongated side edges 13 formed in tape 1. The length of removable masks 17 is less than the width of tape 1 and is preferably less than the distance between sprocket holes 7.

To aid in assembling masks 17 in elongated first apertures 11, at least one and preferably two notches 33 (see FIG. 2) are formed in elongated aperture side edges 13, preferably at or near their intersection with aperture end edges 15 and further preferably at the same end thereof, extending outwardly from first apertures 11. To assemble mask 17 in first aperture 11, the marginal edge 3 or 5 of tape 1 adjacent notches 33 is bent down out of the plane of tape 1 and mask 17 is inserted in elongated aperture 11 making sure that tape side edges 13 engage elongated slots 31. When mask 17 reaches end edge 15 opposite from where it was inserted, the bend placed in tape 1 is released so that tape 1 becomes fully planar and thereby locks removable mask 17 in fixed registration therein.

Figure 2:
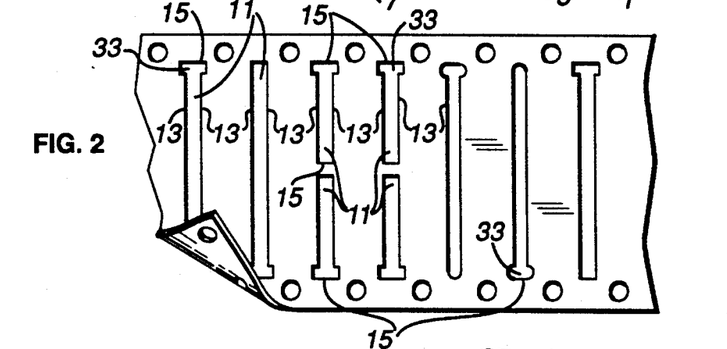
FIG. 2 is another plan view of the endless tape of this invention showing the variety of different apertures for use therein.
Figure 3:
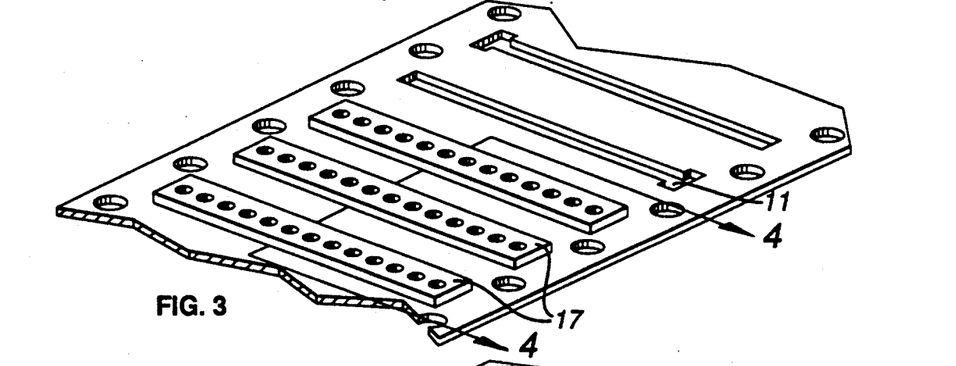
FIG. 3 is an illustrative view of a portion of the endless tape carrying masks that are formed over the apertures.
Figure 4:
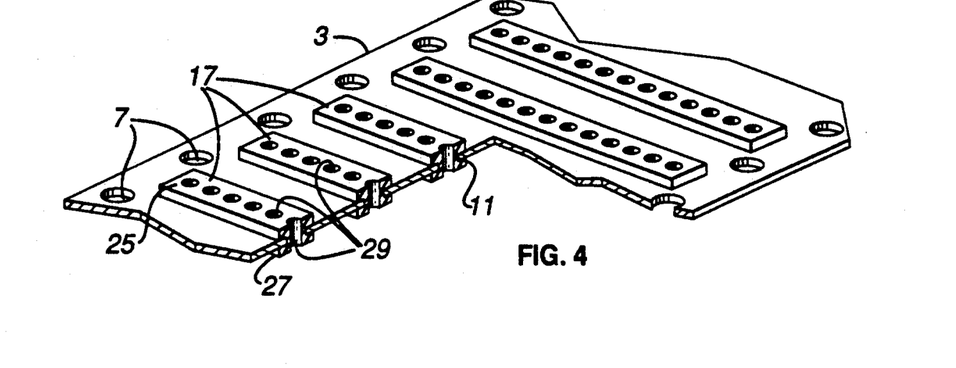
FIG. 4 is a sectional view of the endless tape and masks taken along lines 4—4 in FIG. 3.

As shown in FIG. 2, for averaging the stress generated by bending tape 1 and for spacing reasons, notches 33 are preferably alternated on opposite sides of tape 1 or on opposite ends of the pattern that is repeated when in side-by-side arrangement. Sprocket holes 7, first apertures 11 and notches 33 are most conveniently formed in tape 1 by a die-punching operation. It is preferably that removable masks 17 are arranged such that their central opening is centrally spaced along the length of the mask.

Figure 8:
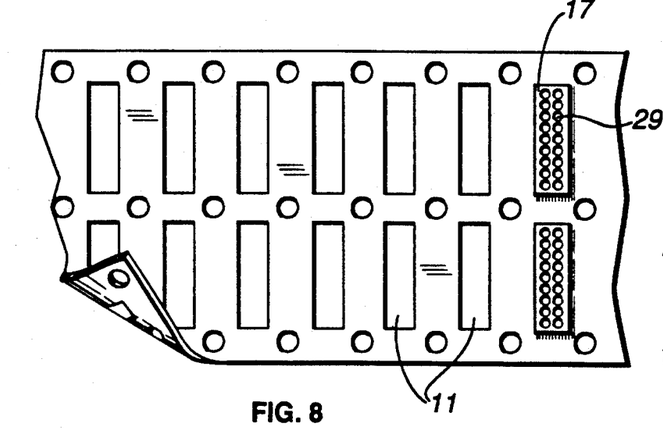
FIGS. 8 and 9 are plan view and side view, respectively, of the carrying tape showing the masks positioned in elongated apertures.
Figure 10:
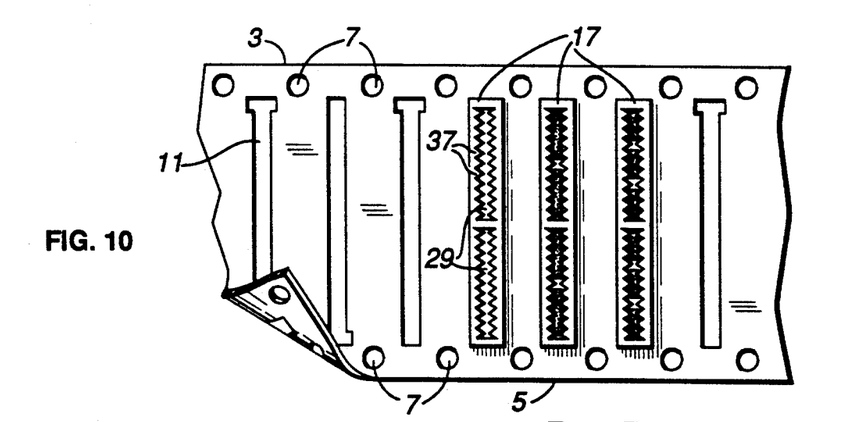
FIGS. 10 and 11 are respectively top side plan views of various arrangements of masks in apertures formed through the endless tape utilized in this invention.
Figure 11:
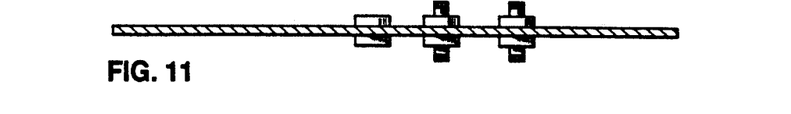
Figure 12:
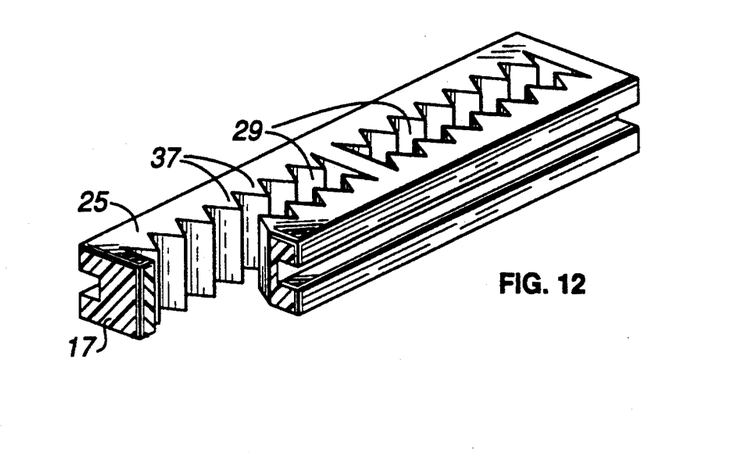
FIG. 12 is an illustrative view of a mask containing therein elongated apertures for holding capacitor chips having elongated shapes for processing in this invention.

Masks 17 may be made in a form wherein second resilient apertures 29 formed therein may be an elongated opening, as shown in FIG. 10, or a series of elongated openings of equal or unequal size and length as shown in FIG. 8, said apertures in FIGS. 10 and 12 bounded by a series of resilient teeth 37 protruding into said openings. This type of configuration will accommodate receipt of chips whose bodies are asymmetrical, i.e., having one body dimension greater than the other, so that only a few of them may be retained in any one mask.

Figures 17A, 17B:
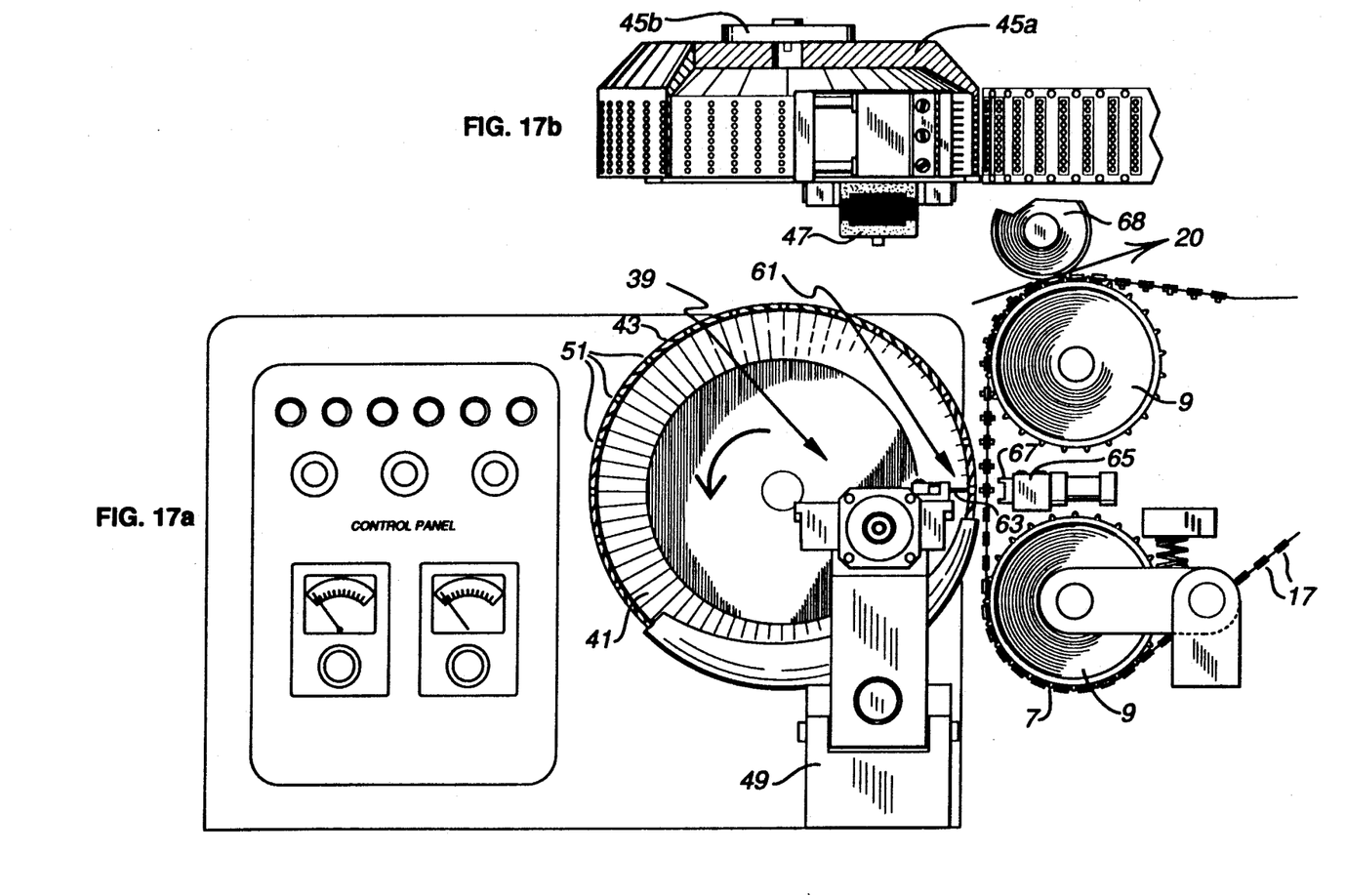

As shown in FIGS. 17, a first means 39 is employed to load masks 17 with a plurality of capacitor chips for processing in the metalizing operation. Means 39 is shown to include a hollow bowl or wheel 41 defined by a thin, cylindrical wall 43, said wheel mounted on a plate and spindle 45a and 45b respectively, that are in turn arranged in contact with a control motor such as a stepper motor 47, all suitably supported on an apparatus frame 49. Cylindrical wall 43 is adapted to rotate about spindle 45b in a circular motion and has formed therethrough at least one but more preferably a plurality of orifices 51 arranged in the same pattern as second apertures 29 in mask 17.

As shown in FIG. 15 orifices 51 are of the size and cross-sectional configuration of chip body 19 and preferably have an angled lead-in opening 53 transitioning from the inside surface of cylindrical wall 43 to orifices 51 to allow a chip deposited in hollow wheel 41 to drop down through angled lead-in opening 53 into orifice 51 as shown in FIG. 15. As shown in FIG. 15, a guard 55 or other temporary restraining device is arranged on the open side of hollow wheel 41 to retain an inventory of chips at the bottom of cylindrical wall 43 as it turns in the direction of the arrow shown therein so as to continually expose orifices 51 to a plurality of loose chips. Vibration and/or suction may be applied to the outside of cylindrical wall 43 to aid in urging the chips into lead-in opening 53 thence into orifices 51, as is presently known in the art, reference one of my previous U.S. Pat. No. 4,526,129. These capacitor chips are usually of a shape wherein their length is greater than their width and depth so that they will fit into orifice 51 in only one orientation.

Figure 16:
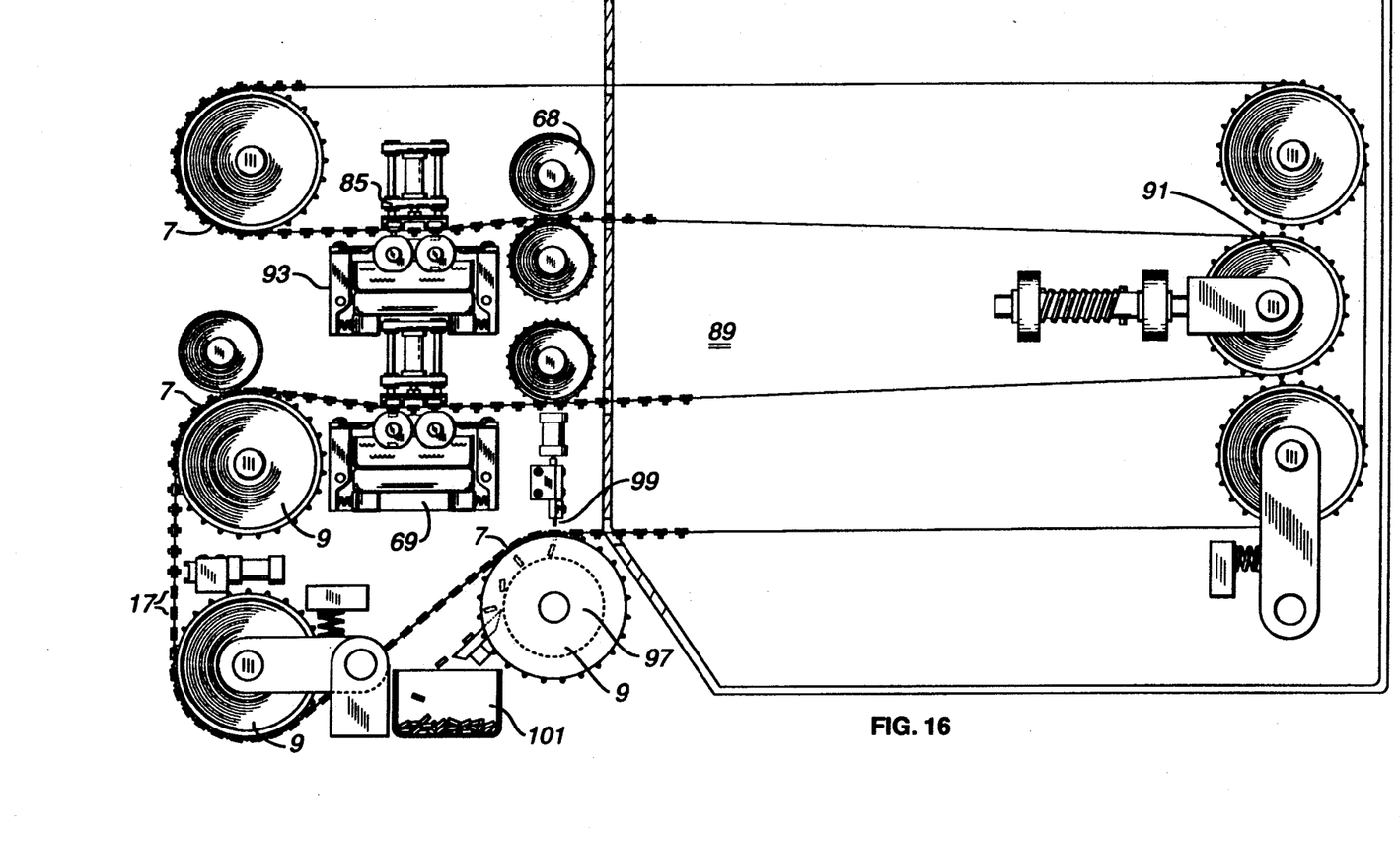
FIG. 16 is an illustrative view of the endless tape as it proceeds through the metalizing and drying process.

Sprocketed drive wheels 9 are shown in FIGS. 16, 17a and 17b arranged in spaced-apart relationship in communication with sprocket holes 7 on tape 1 to advance said tape into a vertical path as shown in FIG. 17a. Electronic controls are used to index stepper motor 47 to bring orifices 51, loaded with chips into aligned registration with second apertures 29 in mask 17. The aligned registration takes place when the chips loaded in orifices 51 move into a vertical posture and are indexed substantially tangential with said apertures. The chips are oriented in orifices 51 such that their ends 23 are aligned axially transverse to the plane of tape 1. Thus situated, when they are brought into registered alignment with second apertures 29 in masks 17, they can be moved in a horizontal rectilinear path directly from orifices 51 into apertures 29.

A second means 61 is provided for transferring the chips from orifices 51 to second apertures 29 along the aforesaid rectilinear path. Shown in FIG. 17a is one embodiment of means 61 whereby an assembly of thin pins 63, arranged in the same pattern as second apertures 29 in masks 17, are mounted for reciprocal movement in orifices 51 in wheel 41. When wheel 41 rotates out of contact with the inventory of loose chips at the bottom thereof, having them temporarily housed in orifices 51, both tape 1 and wheel 41 are advanced into registered alignment to a point preferably in the vertical plane. Pins 63 are then indexed to drive forward into lead-in surfaces 53 and on into orifices 51 to contact the chips axially aligned therein and force them out through orifices 51 into second apertures 29 in masks 17.

A power-driven back-up device such as an air cylinder-driven abutment element 65 is indexed to move a two-pronged fork 67 forward against the opposite surface of tape 1 to span both sides of apertures 29 in masks 17, to prevent movement of tape 1 while the chips are being moved into position in second apertures 29. Using state-of-the-art controls and devices such as stepper motor 47 to operate sprocketed drive wheels 9, one can cause hollow wheel 41 and tape 1 to stop momentarily for the purpose of facilitating the movement of chips from one set of apertures to another and the continue the movement of both wheel 41 and tape 1 until the next set of orifices 51 comes into registered alignment with the next mask and apertures 29 therein in tape 1 following the chips that have just been previously loaded. Both pins 63 and abutment element 65 are then withdrawn from their forward positions to allow wheel 41 and tape 1 to move into their next registered alignment and then again advance to engage in the transfer process.

As shown in FIGS. 17, 20 and 21, after chips 19 are inserted in masks 17, they travel under a chip alignment wheel 68 wheel its smooth, flat, surface contacts the chips and moves them such that their exposed ends are aligned along a common plane. Thereafter, sprocketed drive wheels 9 are employed to advance the chips to a terminating paste applicator station 69 shown in FIG. 18.

As shown in FIG. 18, tape 1 is advanced in a horizontal plane across the upper surfaces of a pair of paste rollers 71a and 71b that are mounted in spaced-apart, parallel arrangement over a hopper 73 and arranged to rotate through said hopper when it is filled with an inventory 75 of termination paste. The paste contains a metal, such as silver, platinum, palladium, gold, or a combination thereof. Glass or other fusible ceramic may also be added to the paste to help fuse the metal in the ceramic matrix of chip body 19.

Paste applicator roller 71a has formed thereon a flat spot 77 in which is formed a deeper cavity 79 of a width sufficient to span the chips arranged in the pattern in masks 17. Roller 71b is shown also to have a flat spot 81 formed thereon, however without an underlying cavity. Rollers 71a and 71b are driven through a pair of intermeshed gear wheels 83 so that, when flat spot 77 with its cavity 79 is rolled into the uppermost horizontal position, flat spot 81 on roller 71b is likewise rolled up into the same position.

An applicator bar 85 is positioned on the opposite side of tape 1 from roller 71a and 71b. In operation, rollers 71a and 71b are partially immersed in paste inventory 75 and rolled in opposite directions as shown by the arrows in FIG. 23. A pair of scrapers 87a and 87b are respectively placed in contact with rollers 81a and 81b to scrape off excess paste from the surface of rollers 71a and 71b and from flat spots 77 and 81 as the rollers turn out of the paste.

As each mask 17 with its load of chips arrives over top of flat spot 77, applicator bar 85 is advanced downward to contact tape 1, apart from said masks, and move it downward so that the exposed end 23 of each chip is dipped into cavity 79 on roller 71a to be coated with a small dab of metal termination paste. Application bar 85 is then retracted. Stepper motor 47, or other controls, drive sprocketed drive wheels 9 to index mask 17 to a new position over top of flat spot 81 in roller 71b. Roller 71b has completed its turn through the inventory of paste but such is all scraped off by a scraper 87b so that flat spot 81 contains only a slight smear of paste as it is indexed to its uppermost position. Applicator bar 85 (FIG. 16) is once again moved into contact with tape 1 and the chips are forced into contact with flat spot 81.

Spot 81 acts as a "dobber" station to pull away from chip end 23 any over-accumulation of metal paste through surface-tension phenomenon. A scraper 87a scrapes off excess paste from roller 71a including flat spot 77b, however, it does not advance into cavity 79 so that a constant depth of paste is maintained in cavity 79 to present to each end of the chip as it comes in contact therewith.

After exiting paste applicator 69, tape 1 is advanced through a heating oven 89, shown in FIG. 20. During its travel through oven 89, the paste is dried for later formation of a metalized coating by high temperature firing. Thereafter, tape 1 exits oven 89 and one or more idler pulleys 91 reverse the direction of tape 1 permitting it to be directed through a second chip alignment wheel 68 and then on to a second paste application station 93, shown in FIG. 16 to be the same as first station 69. After leaving second paste application station 93, an idler pulley reverses the direction of tape 1 to advance it back into drying oven 89 where the second metal paste coating is dried.

Upon exiting drying oven 89 for the second time, tape 1 is moved to an unloading station 97 where a series of ejection pins 99 are moved against the chips to force them out of second apertures 29 to drop by gravity into a hopper 101 for later handling. Thereafter, the empty masks are once again brought up into contact with sprocketed drive wheels 9 to begin the loading process over again.

What is claimed is:

1. Apparatus for automatically metalizing the terminal ends of monolithic capacitor chips, of the type having a solid body defined by spaced-apart mutually opposed electronic contact surfaces adapted for receipt thereover of a coating of metal paste, comprising:
   a) endless conveying tape defined by spaced-apart, mutually parallel marginal edges and drive perforations disposed adjacent at least one marginal edge and spaced longitudinally therealong;
   b) said tape having formed therein a plurality of first apertures arranged between said marginal edges;
   c) a plurality of thin, resilient masks, each adapted for receipt in one of said apertures, in co-planar, fixed registration therewith, each said mask having at least one second aperture formed therethrough of a size and shape to compliantly receive a chip therein, in an orientation whereby said contact surfaces extend outward from both sides of said tape;
   d) means for loading said masks with a plurality of chips including a cylindrical wall having formed therethrough orifices for registration with said second apertures in said mask, said cylindrical wall adapted for rotation through an inventory of said chips for introduction of said chips into said orifices in transverse specific alignment with their contact surfaces extending outward from said cylindrical wall orifices;

e) means for accurately moving said chip-loaded orifices into registration with said second apertures in said masks;

f) means for transferring said chips from said orifices into said second apertures along a rectilinear path therebetween;

g) means for passing said contact surfaces of said chips through an inventory of end-termination paste; and, h) means for drying said paste and expelling said chips from said masks to prepare said masks to receive a new inventory of chips as said endless conveying tape proceeds to repeat its circuit.

2. The apparatus of claim 1 wherein said first apertures are transversely-oriented in said tape, are located centrally between said marginal edges and are spaced uniformly therealong.

3. The apparatus of claim 1 wherein said endless conveying tape comprises a stainless steel tape approximately 0.005" thick and approximately 2" in width.

4. The apparatus of claim 1 wherein said first apertures are round holes.

5. The apparatus of claim 1 wherein said first apertures are a series of elongated rectangular openings defined by a pair of spaced-apart elongated side edges terminated by a pair of short-end edges.

6. The apparatus of claim 5 wherein said elongated apertures are formed in repeated patterns in side-by-side arrangement along the length of said tape.

7. The apparatus of claim 1 wherein said masks ares defined by spaced-apart top and bottom exterior surfaces that lie respectively above and below the surfaces of said tape and co-planar therewith.

8. The apparatus of claim 1 wherein said masks are cast in place about said first apertures and are further defined by a pair of spaced-apart top and bottom exterior surfaces that lie respectively above and below the surfaces of said tape and co-planar therewith.

9. The apparatus of claim 1 wherein said second apertures are smaller than said first apertures.

10. The apparatus of claim 5 wherein said masks are removable and are defined by a pair of spaced-apart top and bottom exterior surfaces that lie respectively above and below the surfaces of said tape and co-planar therewith when assembled in said first apertures and include a pair of opposed, elongated slots intermediate said top and bottom surfaces for receipt therein of said first aperture elongated side edges.

11. The apparatus of claim 10 wherein said first apertures have formed therein at least one notch at said first aperture end edge, extending outward from said first apertures, for aid in assembling said masks in said elongated first apertures.

12. The apparatus of claim 1 further including a chip alignment wheel arranged in communication with said means for accurately moving said chip loaded orifices to insure that the exposed ends of said chip are aligned in a common plane.

13. The apparatus of claim 11 wherein said first apertures and said notches are arranged in alternate, side-by-side arrangement such that said notches are alternatively adjacent one of said marginal edges of said tape.

14. The apparatus of claim 1 wherein said second apertures in said masks are formed into the shape of a single, elongated opening for receipt therein of a capacitor chip whose body is asymmetrical.

15. The apparatus of claim 14 wherein a series of resilient teeth are formed in said mask, that protrude into said second apertures.

16. The apparatus of claim 1 wherein said second apertures in said masks are formed into the shape of a plurality of elongated openings for receipt therein a plurality of capacitor chips whose bodies are asymmetrical.

17. The apparatus of claim 16 wherein a series of resilient teeth are formed in said mask, that protrude into said second apertures.

18. The apparatus of claim 1 wherein said means for loading said mask with a plurality of chips further includes a plate on which said cylindrical wall is mounted and a spindle on which said plate is mounted and further including means for rotating said cylindrical wall in a controlled fashion at controlled speeds through controlled positions.

19. The apparatus of claim 1 wherein said orifices include an angled lead-in opening transitioning from the inside surface of said cylindrical wall into said orifices to allow a chip deposited in said cylindrical wall to drop down through said angled lead-in opening into said orifice.

20. The apparatus of claim 1 wherein said means for loading said masks with a plurality of chips includes means for retaining an inventory of chips at the bottom of said cylindrical wall as it rotates therethrough so as to continually expose said orifices to a plurality of loose chips.

21. The apparatus of claim 20 further including means for applying suction to the outside of said cylindrical wall to aid in urging the chips into said orifices.

22. The apparatus of claim 20 further including means for applying vibration to the outside of said cylindrical wall to aid in urging the chips into said orifices.

23. The apparatus of claim 1 further including sprocketed drive wheels arranged in spaced-apart relationship in communication with said drive holes formed in said tape to advance said tape into a vertical path in registered alignment with said second apertures formed in said mask.

24. The apparatus of claim 1 wherein said means for transferring said chips from said orifices into said second apertures in said masks include a plurality of pins, arranged in a pattern corresponding to the patterns set in said mask, indexed to move forward into said orifices to contact the chips axially aligned therein and force them along a rectilinear path out through said orifices into said second apertures in said mask.

25. The apparatus of claim 24 further including a back-up device arranged and indexed to move forward against the opposite surface of said tape to prevent movement of said tape while the chips are being moved along their rectilinear path into said second apertures.

26. The apparatus of claim 1 wherein said means for passing said exposed ends of said chip through an inventory of end-termination paste, include:

a) a pair of first and second metal paste rollers mounted in spaced-apart, parallel arrangement over a hopper and arranged to rotate through said hopper when it is filled with an inventory of end-termination paste;

b) a flat spot formed on said rollers, said first paste roller having a deep cavity formed therein of a width sufficient to span the chips arranged in a pattern in said masks, said first and second rollers driven through a pair of intermeshed gear wheels attached thereto and arranged so that said flat spots are rolled into an uppermost horizontal position simultaneously;

c) applicator means positioned on the opposite side of said tape as said tape advances over said paste applicator rollers and arranged to index forward into contact with the tape and force said tape toward said flat spots on said rollers and bring the terminal ends of the chips carried in said second apertures into contact with the inventory of said end-termination paste carried in said cavity and thereafter to be again brought into contact with said flat spot on said second roll to remove any over-accumulation of end-termination paste through surface-tension phenomena; and, d) a scraper arranged in contact with said rollers and spanning said flat spots to scrape off excess paste from said rollers and direct it back into said hopper as said rollers turn.

* * * * *